United States Patent [19]

Sakurai et al.

[11] Patent Number: 4,814,992
[45] Date of Patent: Mar. 21, 1989

[54] FUEL INJECTION CONTROL SYSTEM FOR ENGINE

[75] Inventors: Hidetoshi Sakurai, Saitama; Nobutoshi Maruyama; Hiroshi Ogawa, both of Kanagawa, all of Japan

[73] Assignee: Honda Giken Kogyo Kabushiki Kaisha, Tokyo, Japan

[21] Appl. No.: 922,019

[22] Filed: Oct. 21, 1986

[30] Foreign Application Priority Data

Oct. 21, 1985 [JP] Japan .............................. 60-236019

[51] Int. Cl.$^4$ ............................................. F02M 51/00
[52] U.S. Cl. ........................... 364/431.07; 364/431.05; 123/492; 123/480; 123/479
[58] Field of Search ....................... 364/431.05, 431.11, 364/431.07; 123/479, 487, 480, 478, 492; 371/11, 12, 14

[56] References Cited

U.S. PATENT DOCUMENTS

| | | | |
|---|---|---|---|
| 4,255,789 | 3/1981 | Hartford et al. | 364/431.06 |
| 4,354,239 | 10/1982 | Kanegae | 364/431.05 |
| 4,386,427 | 5/1983 | Hosaka | 371/11 |
| 4,587,615 | 5/1986 | Takahashi | 364/431.11 |
| 4,587,655 | 5/1986 | Hirao et al. | 364/431.11 X |
| 4,590,566 | 5/1986 | Takahashi | 364/431.11 |
| 4,617,899 | 10/1986 | Nakajima | 364/431.05 X |
| 4,664,082 | 5/1987 | Suzuki | 123/479 X |

*Primary Examiner*—Parshotam S. Lall
*Assistant Examiner*—V. N. Trans
*Attorney, Agent, or Firm*—Lyon & Lyon

[57] ABSTRACT

A fuel injection control system for an engine having a plurality of cylinders includes a plurality of driver units for actuating fuel injection valves on the respective cylinders, a processing unit for starting processing operation in synchronism with a cycle of operation of the cylinders when the engine is in a normal operation mode, to compute times for which the fuel injection valves are to be opened based on an engine operating condition in the normal operation mode and to issue processed data, and for starting processing operation out of synchronism with the cycle of operation when the engine is in a particular operation mode, to compute times for which the fuel injection valves are to be opened based on an engine operating condition in the particular operation mode and to issue processed data, and a plurality of counters for successively opening the fuel injection valves through the driver units based on the processed data set in the counters and corresponding to the computed times from the processing means when the engine is in the normal operation mode. The fuel injection control system also includes a counter operation discriminating unit for detecting those counters which are not in operation when the engine is in the particular operation mode and generating a discrimination singal, and a processed data assigning unit responsive to the discrimination signal for assigning the processed data computed in the particular operation mode to those counters which are not in operation.

7 Claims, 5 Drawing Sheets

FUEL INJECTION CONTROL SYSTEM FOR ENGINE

BACKGROUND OF THE INVENTION

1. Field of the Invention

The present invention relates to a fuel injection control system for use with an engine, and more particularly to an improvement in the electric arrangement of an electronic fuel injection control system.

2. Prior Art

The rate at which fuel is supplied to an engine is required to be controlled according to the operating conditions of the engine. In recent years, such fuel supply control has been performed by an electronic control system using a microcomputer.

FIG. 5 of the accompanying drawings illustrates one conventional electronic fuel injection control system for an engine.

In FIG. 5, the electronic fuel injection control system includes a central processing unit (CPU) 11, a read-only memory (ROM) 12, a random-access memory (13), an input port 14 for receiving signals from various sensors on the engine, an output port 15 for generating signals to operate various actuators, a driver circuit 16 for operating fuel injection valves, and a data bus 17 for transferring data between the CPU 11, the ROM 12, the RAM 13, the input port 14, and the output port 15.

The ROM 12 stores a program for processing logics and an operation sequence to be executed by the CPU 11 and data for controlling processing operations. The RAM 13 serves to store input and output data and processed data. The input port 14 is supplied with various sensor signal data DT such as engine vacuum PB, engine speed Ne, coolant temperature Tw, and throttle opening $\theta$th. These data items are converted by an A/D converter (not shown) to corresponding digital signals that are supplied to the CPU 11 for processing.

The output port 15 produces pulse-duration signals and on-off signals required to operate various actutators (not shown). For a four-cylinder engine, for example, the output port 15 has, in its area related to the fuel injection system, four counters 151 through 154 corresponding to the four engine cylinders, and an additional asynchronous counter 150. The counters 151 through 154 successively operate corresponding units 161 through 164 of the fuel injection valve driver circuit 16. The counter 150 however operates all of the units 161 through 164 simultaneously. The units 161 through 164 of the driver circuit 16 serve as driver units for respective fuel injection valves (not shown) on the engine cylinders. The driver units 161 through 164 include respective power amplifiers (not shown) for generating electric power required to actuate the fuel injection valves in response to output signals from the counters 151 through 154 or an output signal from the counter 150.

Operation of the conventional control system shown in FIG. 5 is as follows:

A certain crank angle during rotation of the engine, for example, the angle of 90 degrees prior to an intake stroke corresponds to a top dead center. This angle position is detected by a top-dead-center sensor to produce a top-dead-center signal (TDC signal) S1, based on which the CPU 11 starts operating. More specifically, the CPU 11 is responsive to the first TDC signal for computing the amount of fuel to be injected into the #1 cylinder, i.e., the time for which the #1 fuel injection valve is to be opened. Similarly, the CPU 11 is responsive to the second TDC signal for computing the amount of fuel to be injected into the #3 cylinder, i.e., the time for which the #3 fuel injection valve is to be opened. In response to the third and fourth TDC signals, the CPU 11 computes the times for which the respective #4 and #2 fuel injection valves are to be opened to inject fuel into the #4 and #2 cylinders. The computed data items are delivered over the data bus 17 into the counters 151 through 154, respectively. The driver units 161 through 164 are responsive to these data items from the counters 151 through 154 for energizing solenoids (not shown) to open the fuel injection valves, respectively, for the computed times.

In addition to the above normal fuel injection timing, there is generated additional fuel injection timing by an interrupt caused by a timer cycle signal S2 that is produced by a timer operating out of synchronism with the operation cycle of the engine cylinders, under engine operating conditions requiring extra fuel such as during acceleration. More specifically, when an accelerating condition is detected on the basis of the timer cycle signal S2, the CPU 11 computes a time for which the fuel injection valves are to be opened in response to the timer cycle signal S2. Since the computed data does not have normal fuel injection timing, it is stored in the asynchronous counter 150. The asynchronous counter 150 energizes the driver units 161 through 164 simultaneously to open all of the fuel injection valves at the same time. The simultaneously injected fuel is consumed successively in the cylinders according to their strokes.

The conventional fuel injection control system as described above requires an extra counter in addition to those associated with the engine cylinders in order to operate the fuel injection valves to meet all engine operating conditions. This additional counter, which counts up to several binary positions in microseconds, makes the control system complex and costly.

SUMMARY OF THE INVENTION

In view of the aforesaid drawbacks of the conventional fuel injection control system, it is an object of the present invention to provide a fuel injection control system for an engine which is simple in arrangement and inexpensive to manufacture.

According to the present invention, there is provided a fuel injection control system for an engine having a plurality of cylinders associated with respective fuel injection valves, comprising processing means for starting a processing operation in synchronism with a cycle of operation of the cylinders when the engine is in a normal operation mode, to compute times for which the fuel injection valves are to be opened based on an engine operating condition in the normal operation mode and to issue processed data, and for starting processing operation out of synchronism with the cycle of operation when the engine is in a particular operation mode, to compute times for which the fuel injection valves are to be opened based on an engine operating condition in the particular operation mode and to issue processed data, a plurality of driver units associated respectively with the fuel injection valves for actuating the fuel injection valves, respectively, a plurality of counters coupled respectively to the driver units for successively opening the fuel injection valves through the driver units based on the processed data set in the counters and corresponding to the computed times from the processing means when the engine is in the normal operation mode, counter operation discriminating means for detecting those counters which are not in counting operation when the engine is in the particular operation mode and generating a discrimination signal, and processed data assigning means responsive to the discrimination signal for assigning the processed data computed in the particular operation mode to those counters which are not in counting operation.

The times are computed by the processing means based on at least an engine load, an engine speed, a throttle valve opening, and a coolant temperature.

The counter operation discriminating means detects whether there is an output signal from each of the counters to generate the discrimination signal, and the processed data assigning means assigns the processed data to all of the counters which are not in counting operation.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
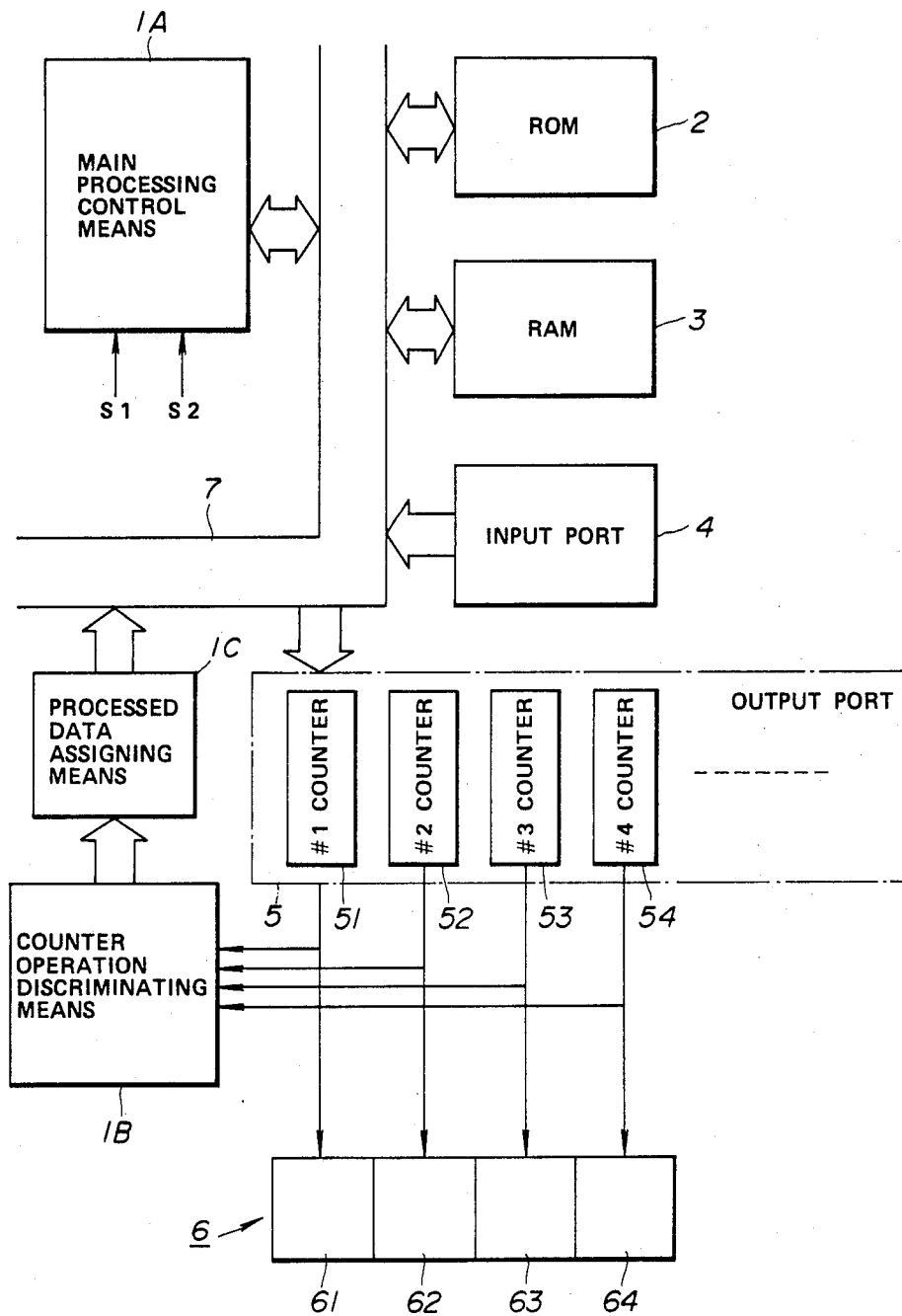
FIG. 1 is a block diagram of a fuel injection control system according to the present invention.

As shown in FIG. 1, a fuel injection control system according to the present invention includes a main processing control means 1A, a counter operation discriminating means 1B, a processed data assigning means 1C, a read-only memory 2, a random-access memory 3, an input port 4 for receiving signals from various sensors on the engine, an output port 5 for generating signals to operate various actuators, a driver circuit 6 for operating fuel injection valves, and a data bus 7 for transferring data between these control system components.

The main processing control means 1A, the counter operation discriminating means 1B, and the processed data assigning means 1C jointly constitute a central processing unit (CPU). Unless these means are to be separately indicated, they will hereinafter be referred to collectively as a CPU 1. The main processing control means 1A serves to control the entire control system. The counter operation discriminating means 1B determines which counters 51 through 54 (described later) are counting or not by monitoring output signals from these counters 51 through 54. The counter operation discriminating means 1B sets a flag "1" for those counters which produce their output signals, and sets a flag "0" for those counters which are not counting. The processed data assigning means 1C assigns data which is computed by the main processing control means 1A based on data from the input port 4, to those counters with the flag "0" based on the flags set by the counter operation discriminating means 1B.

The ROM 2 stores a program for processing logics and an operation sequence to be executed by the CPU 1 and data for controlling processing operations. The RAM 3 serves to store input and output data and processed data. The input port 4 is supplied with various sensor signal data such as engine vacuum PB, engine speed Ne, coolant temperature Tw, and throttle opening $\theta$th. These data items are converted by an A/D converter (not shown) to corresponding digital signals that are supplied to the CPU 1 for processing.

The output port 5 produces pulse-duration signals and on-off signals required to operate various actuators (not shown). For a four-cylinder engine, for example, the output port 5 has, in its area related to the fuel injection system, four counters 51 through 54 corresponding to the four engine cylinders. The counters 51 through 54 operate corresponding units 61 through 64 of the fuel injection valve driver circuit 6. The units 61 through 64 of the driver circuit 6 serve as driver units for respective fuel injection valves (not shown) on the engine cylinders. The driver units 61 through 64 include respective power amplifiers (not shown) and other components for generating electric power required to actuate the fuel injection valves in response to output signals of the counters 51 through 54. The output signals from the counters 51 through 54 are applied to the counter operation discriminating means 1B to enable the same to ascertain whether there are count outputs from these counters.

Operation of the fuel injection control system of FIG. 1 will be described with reference to the flowchart of FIGS. 2 and 3 and the timing chart of FIG. 4.

Figure 2:
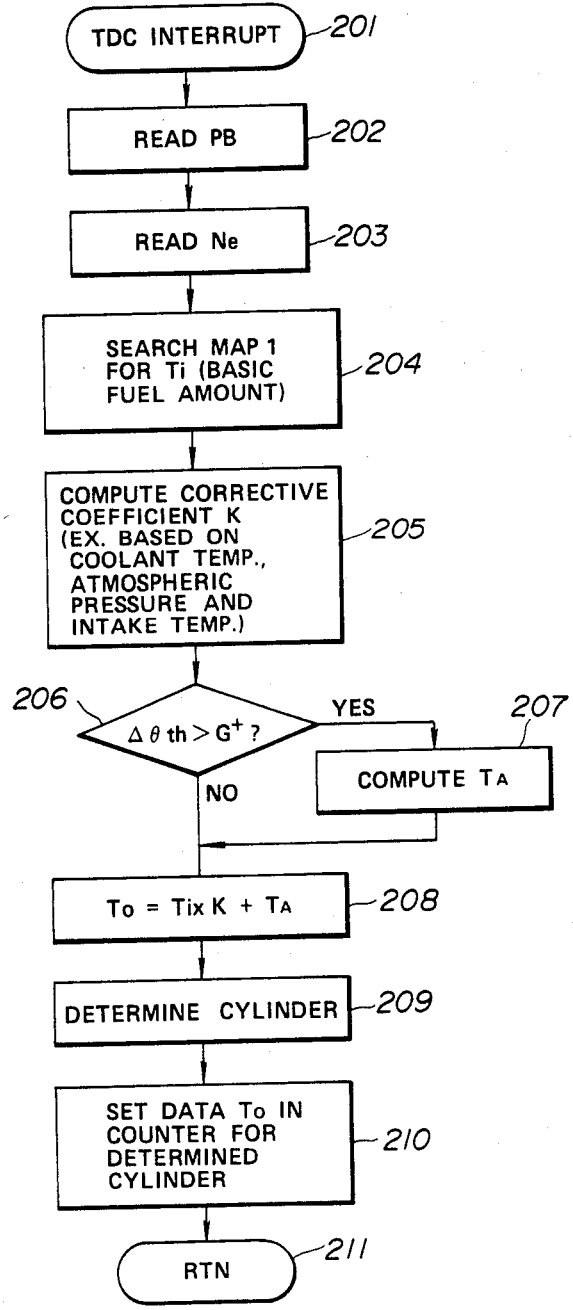
FIGS. 2 and 3 are flowcharts showing operation sequences of the fuel injection control system shown in FIG. 1.
Figure 3:
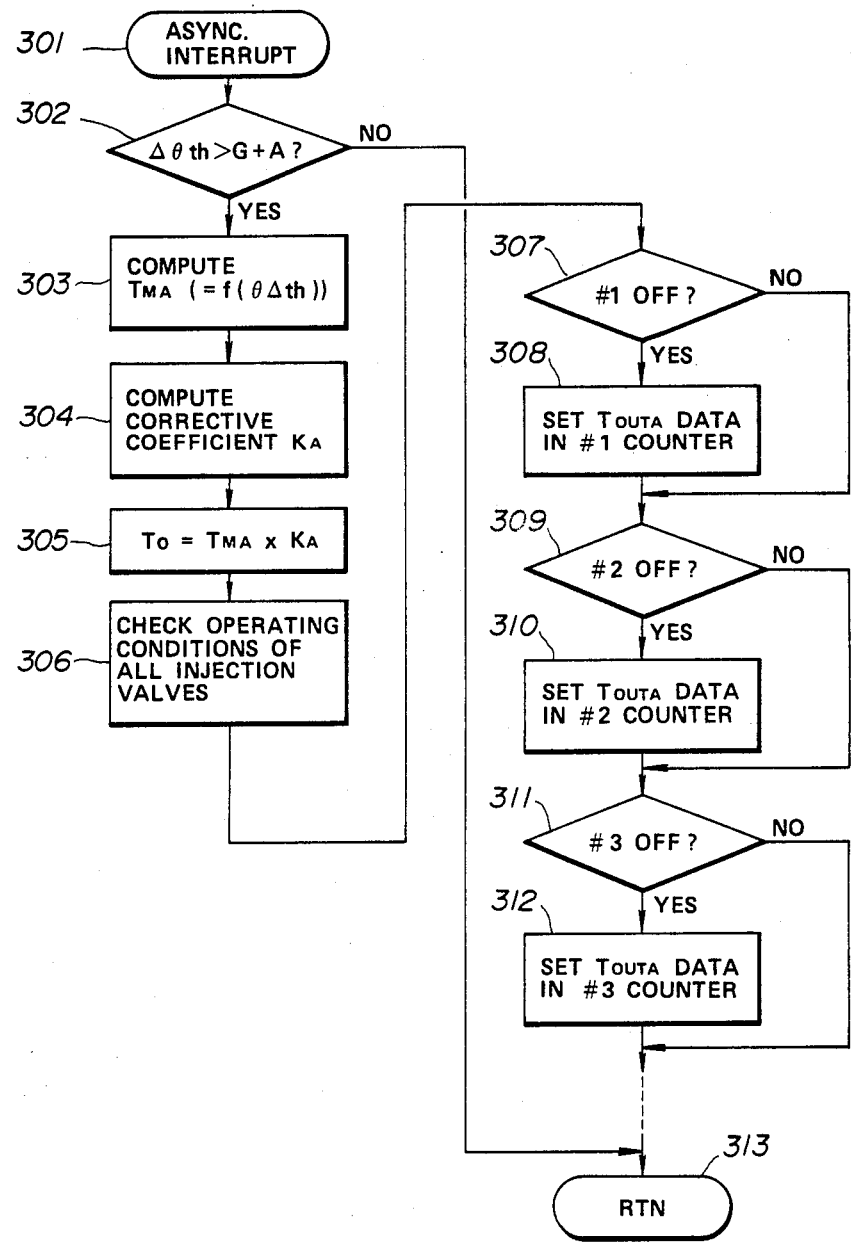

FIG. 2 shows a fuel injection mode initiated by an interrupt based on a TDC signal S1 under normal engine operating conditions. When the pistons in the respective cylinders reach the top dead centers, the TDC signals are successively produced in the firing order of the cylinders #1, #3, #4, #2 (see FIG. 4(b)). The TDC signal S1 initiates an interrupt in a step 201 (FIG. 2), and the main processing control means 1A reads the engine vacuum PB and the engine speed Ne through the input port 4 into the RAM 3 in steps 202, 203, respectively. In practice, the engine speed Ne is detected by detecting its reciprocal Me=1/Ne based on a timer cycle signal S2 (see FIG. 4(a)). The vacuum data PB and the speed data Me stored in the RAM 3 determine an address for searching for a basic amount Ti of fuel to be injected stored in the ROM 2. More specifically, the ROM 2 stores a map or file of values of the basic fuel amount Ti which correspond to various PB-Me values. The main processing control means 1A is responsive to the data items PB, Me for enabling an address generator (not shown) to generate an address based on which the stored map is searched for the basic fuel amount Ti in a step 204. Then, the main processing control means 1A computes a corrective coefficient K based on other detected signals from the input port 4 in a step 205. The basic fuel amount Ti is corrected by the corrective coefficient based on the coolant temperature, the atmospheric pressure, and the intake air temperature. To produce a basic value (amount of fuel to be increased for acceleration) TA by which the amount of fuel to be injected will be increased upon acceleration, the main processing control means 1A ascertains in a step 206 whether a change in the opening of the throttle valve, i.e., a valve opening speed $\Delta\theta$th is larger than a reference value G+. If the valve opening speed $\Delta\theta$th is larger than the reference value G+, then it is determined that the engine is in an accelerating mode and the amount of fuel TA to be increased for acceleration is computed in a step 207. If not, no such computation is effected and hence TA=0.

Thereafter, the total amount of fuel to be injected To=Ti×K+TA is computed by the main processing control means 1A in a step 208. The main processing control means 1A then determines from which cylinder the TDC signal S1 has been generated in a step 209, and sets the computed data To in the counter for the determined cylinder in step 210. Then, the processing returns from a step 211 to the step 201.

In the normal routine, therefore, the processing cycle for determining the amount of fuel To to be injected is started on the basis of the TDC signal. As shown in FIGS. 4(c) through 4(f), the processed data To is set successively as To1, To3, To4, To2 in the counters 51, 53, 54, 52 in timed relation to the respective TDC signals. At the same time that these data items are set in the counters, the corresponding driver units 61 through 64 of the driver circuit 6 are actuated to open the respective fuel injection valves (not shown) for the preset times as indicated by the dotted lines in FIGS. 4(c) through 4(f).

Figure 4:
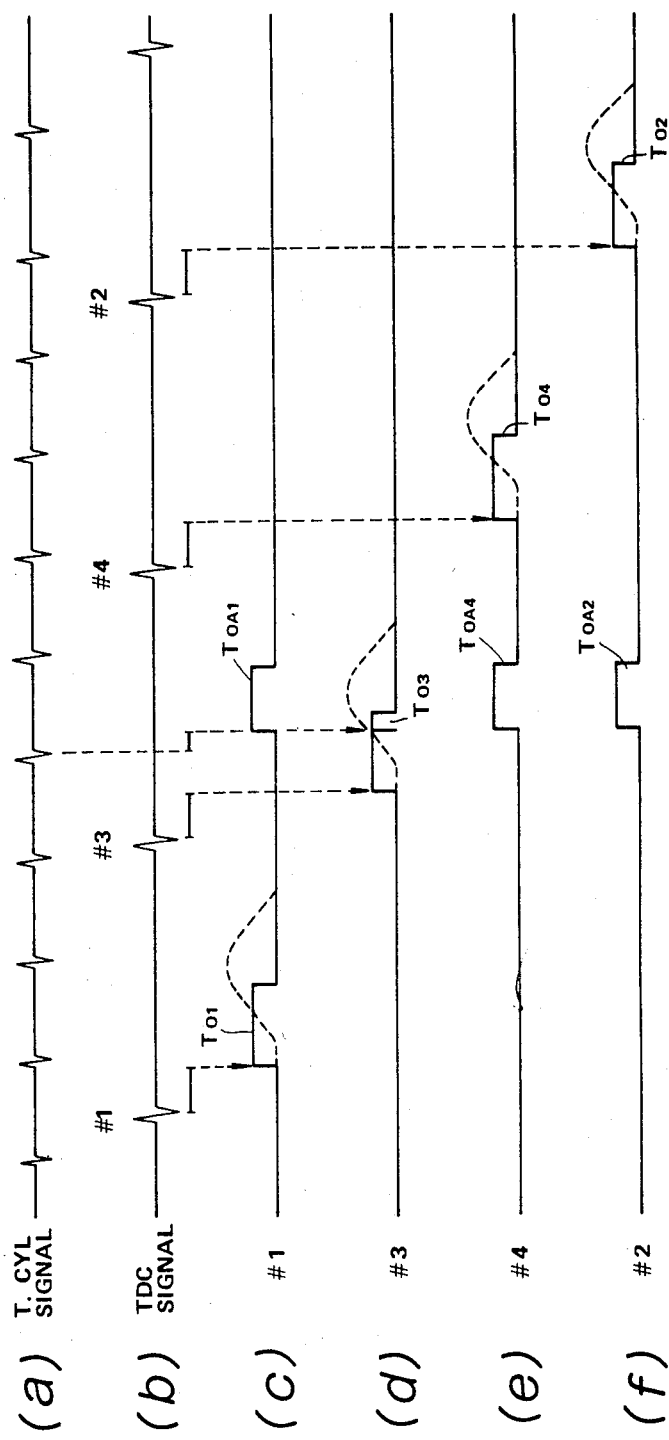
FIG. 4 is a timing chart of operation cycles of the fuel injection control system of FIG. 2.
Figure 5:
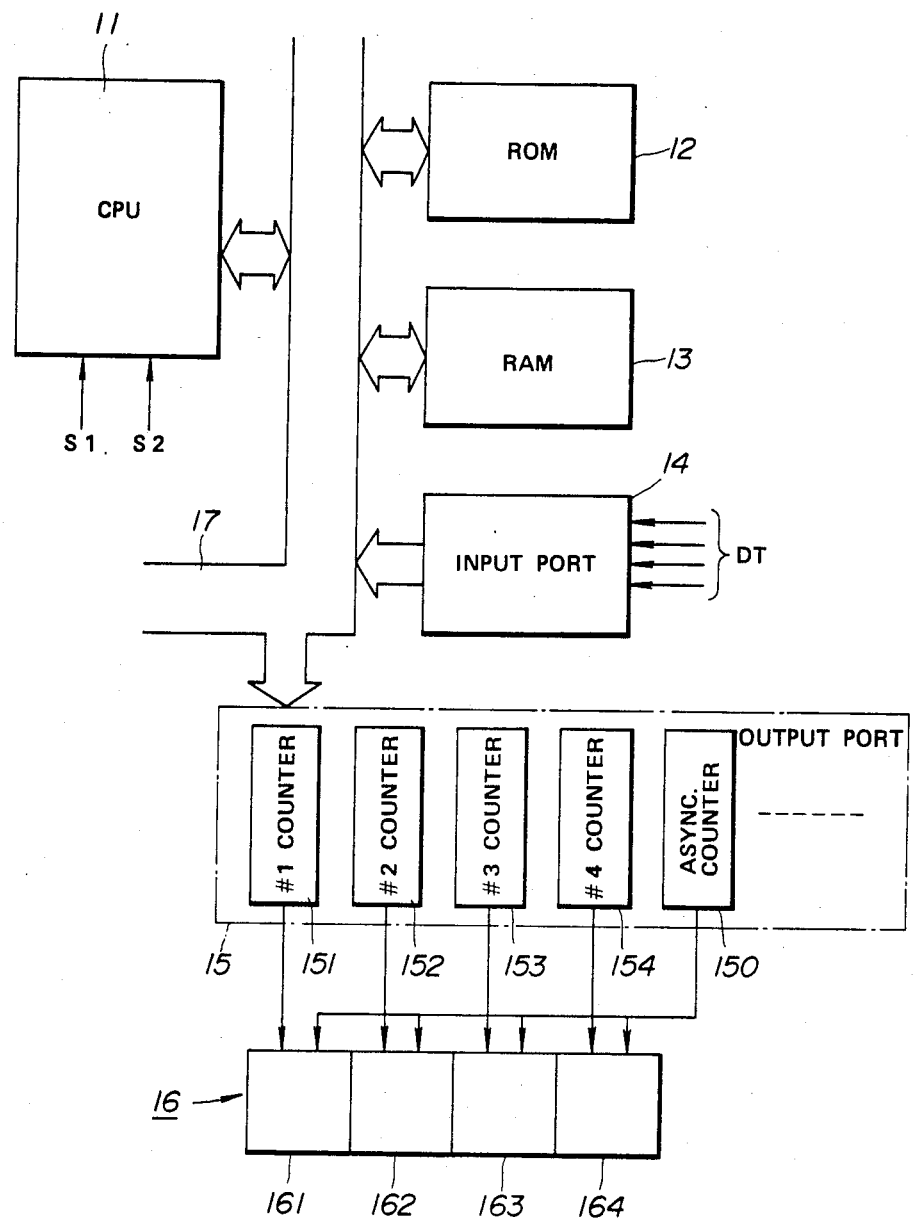
FIG. 5 is a block diagram of a conventional fuel injection control system.

When an interrupt is initiated by the timer cycle signal S2 (FIG. 4(a)) in a step 301 (FIG. 3), the main processing control means 1A ascertains in a step 302 whether the throttle valve opening speed $\Delta\theta$th is larger than a reference value G+A based on the signal DT from the input port 4. Unlike the reference value G+, the reference value G+A is used to determine the accelerating condition upon an asynchronous interrupt. If $\Delta\theta$th<G+A, then the processing returns from a step 313. If $\Delta\theta$th>G+A, then the main processing control means 1A searches the map stored in the ROM 2 for a basic fuel amount TMA to be increased for acceleration according to the valve opening speed $\Delta\theta$th, in a step 303. Then, a step 304 determines a corrective coefficient KA based on the coolant temperature, the atmospheric pressure, and the intake air temperature, from the ROM 2, followed by a step 305 in which data To=TMA×KA corresponding to the amount of fuel to be injected is computed. Thereafter, the counter operation discriminating means 1B connected to the counters 51 through 54 checks the operating conditions of these counters, i.e., the operating conditions of all of the fuel injection valves, in a step 306. The processed data assigning means 1C checks the flags set by the counter operation discriminating means 1B against the address for the data computed by the main processing control means 1A to successively ascertain in steps 307, 309, 311 whether the #1 through #4 counters 51 through 54 are counting operating or not. The processed data assigning means 1C then assigns the data To to those counters which are not in counting operation, in steps 308, 310, 312. The data To is assigned substantially simultaneously at prescribed timing. By thus setting the data in those counter that are not counting operating, the corresponding driver units of the driver circuit 6 are actuated to open the fuel injection valves of the associated cylinders. Valve opening signals based on the assigned data are indicated by TOA1, TOA4, TOA2 in FIG. 4. More specifically, after a fuel injection signal T03 has been generated by the TDC signal, the accelerating condition is detected by the timer cycle signal SW and fuel injection time data is produced. Since the counter 53 corresponding to the #3 cylinder is in counting operation, signals are assigned to the other counters 51, 52, 54 to produce the valve opening signals TOA1, TOA4, TOA2.

In the above embodiment, the counter to which the data for the amount of fuel to be increased for acceleration is not assigned (i.e., the #3 counter corresponding to the #3 cylinder) continues to issue the fuel injection signal T03 based on the TDC signal. However, this counter may be cleared. Alternatively, suitable counters may be selected in which the previous data and the interrupt data for the amount of fuel to be increased may be added.

The counter operation discriminating means may monitor gates by which the processed data from the main processing control means is issued, rather than monitoring the output port.

With the arrangement of the fuel injection control system according to the present invention, as described above, asynchronous data for an amount of fuel to be increased for acceleration is assigned to those counters which are not in counting operation. The fuel injection control system is simple in structure and inexpensive to manufacture.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A fuel injection control system for an engine having a plurality of cylinders associated with respective fuel injection valves, comprising:

processing means for starting processing operation in synchronism with a cycle of operation of the cylinders when the engine is in a normal operation mode, to compute times for which the fuel injection valves are to be opened based on an engine operating condition in the normal operation mode and to issue processed data, and for starting processing operation out of synchronism with said cycle of operation when the engine is in an accelerating mode, to compute times for which the fuel injection valves are to be opened based on an engine operating condition in the accelerating mode and to issue processed data;

a plurality of driver units associated respectively with the fuel injection valves for actuating the fuel injection valves, respectively;

a plurality of counters coupled respectively to said driver units for successively opening the fuel injection valves through said driver units based on the processed data set in the counters and corresponding to the computed times from said processing means when the engine is in the normal operation mode;

counter operation discriminating means for detecting those counters which are not in counting operation when the engine is in the accelerating mode and generating a discrimination signal; and processed data assigning means responsive to said discrimination signal for assigning the processed data computed in said accelerating mode to those counters which are not in counting operation.

2. A fuel injection control system according to claim 1, wherein said times are computed by said processing means based on at least an engine load, an engine speed, a throttle valve opening, and a coolant temperature.

3. A fuel injection control system according to claim 2, wherein said cycle of operation is based on a top-dead-center signal for each of the cylinders.

4. A fuel injection control system according to claim 3, wherein the processing operation out of synchronism with said cycle of operation is based on a timer cycle signal.

5. A fuel injection control system according to claim 1, wherein said counter operation discriminating means detects whether there is an output signal from each of said counters to generate said discrimination signal.

6. A fuel injection control system according to claim 1, wherein said processed data assigning means assigns the processed data to all of the counters which are not in counting operation.

7. A fuel injection control system according to claim 1, wherein said processed data assigning means assigns the processed data to preselected ones of said counters.

* * * * *

UNITED STATES PATENT AND TRADEMARK OFFICE
CERTIFICATE OF CORRECTION

PATENT NO. : 4,814,992

DATED : September 21, 1989

INVENTOR(S) : Hidetoshi SAKURAI et al

It is certified that error appears in the above-identified patent and that said Letters Patent is hereby corrected as shown below:

Title page, `[73]

Add the following name as an additional Assignee
-- Matsushita Electric Industrial Co., Ltd. Osaka, Japan --.

Signed and Sealed this

Twenty-third Day of February, 1993

Attest:

STEPHEN G. KUNIN

Attesting Officer

Acting Commissioner of Patents and Trademarks